Dec. 31, 1963
A. J. SPARLING
3,115,897
PRESSURE CONTROLLER
Filed Dec. 13, 1961
2 Sheets-Sheet 1
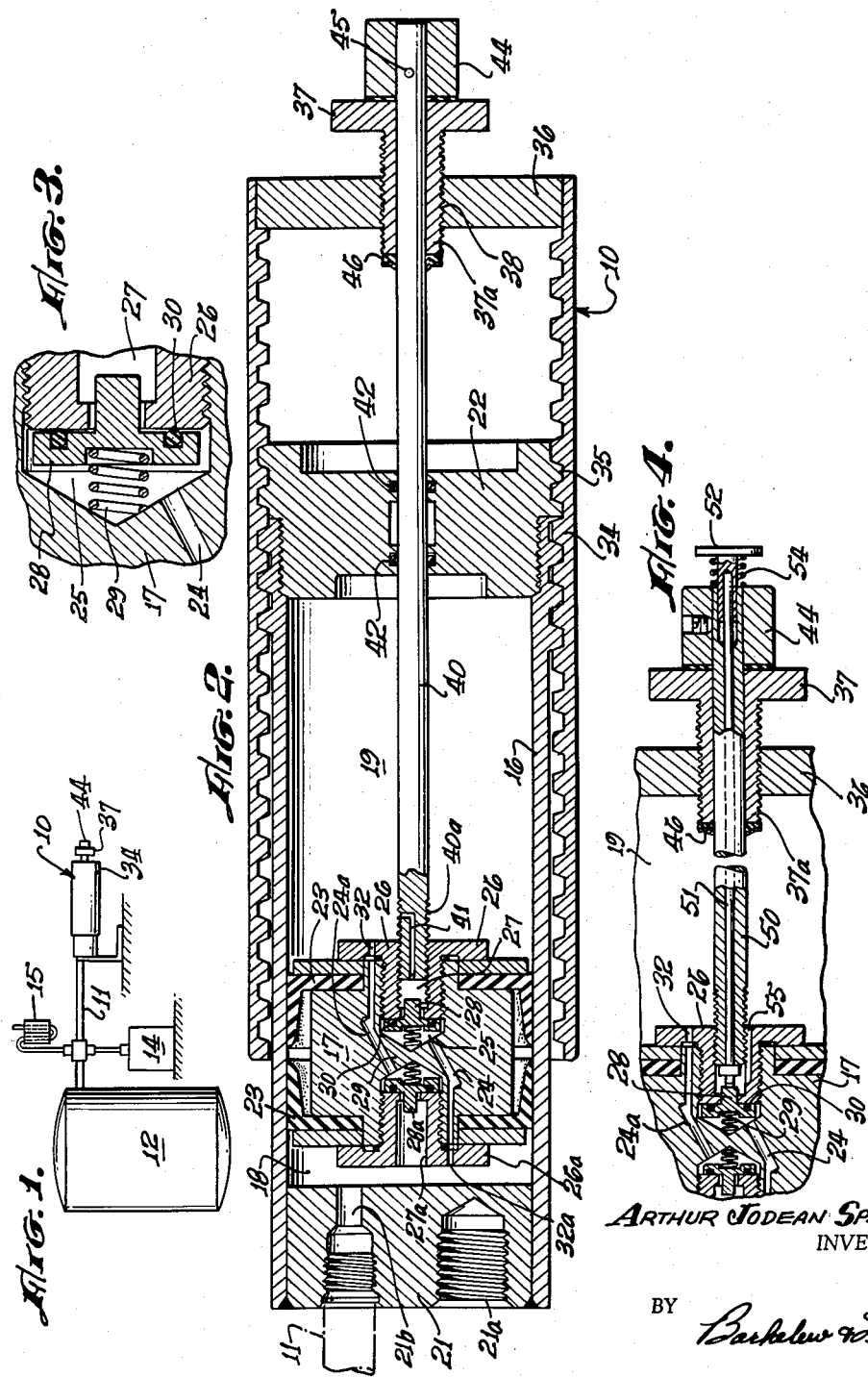
ARTHUR JODEAN SPARLING,
INVENTOR.
BY Barkelew & Lewis

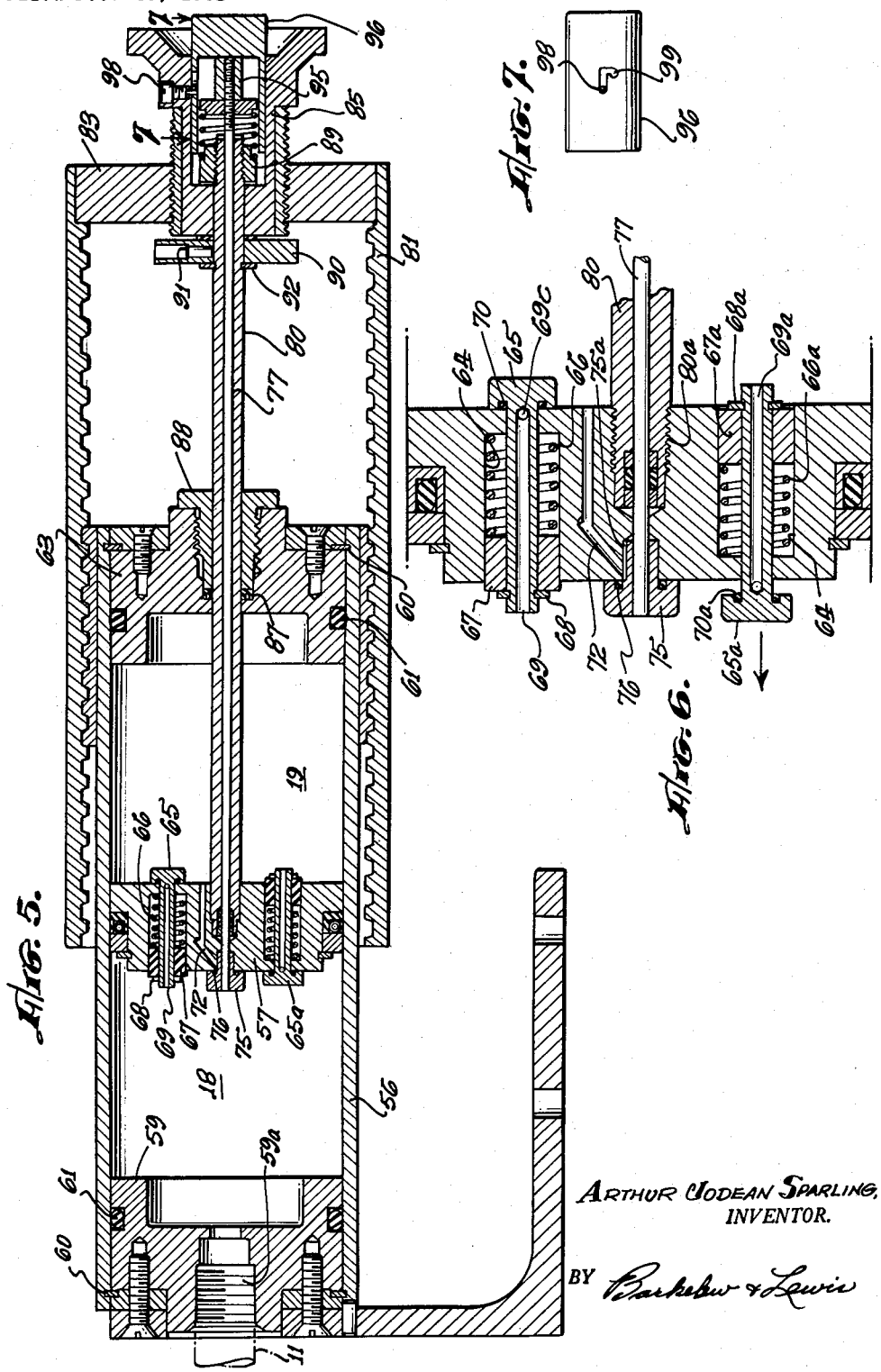

United States Patent Office 3,115,897
Patented Dec. 31, 1963

3,115,897
PRESSURE CONTROLLER
Arthur Jodean Sparling, Manhattan Beach, Calif., assignor to Mitchell Camera Corporation, Glendale, Calif., a corporation of Delaware
Filed Dec. 13, 1961, Ser. No. 159,187
13 Claims. (Cl. 138—31)

The present invention relates generally to gas pressure controlling devices, and more especially to a device of an adjustable character by which a very accurate control of gas pressure in a closed system can be obtained by manual adjustment of the device.

In the case of scientific apparatus used under laboratory conditions there arise situations from time to time in which it is desired to be able to adjust within very narrow limits the gas pressure in a closed system. One example of such circumstances is the calibration of a pressure indicating instrument. Pressure regulators of this general character have been known for adjusting gas pressure; but they have had no greater degree of accuracy in adjusting the gas pressure than the degree of accuracy of the available pressure indicating instrument such as a dial gauge or a manometer for example. A higher degree of accuracy in a pressure regulator than in the available type of pressure indicating device was unnecessary because the additional accuracy was not usable.

Now with the development of more precise pressure indicators, especially an indicator of the type generally known as a dead weight tester, there is a need for a precision pressure regulator or controller; and it is an object of the present invention to provide such an instrument for use in connection with a closed circuit.

The present invention provides a manually adjustable device which is connected to a pressure vessel or the like and thus becomes itself a part of a closed system which is filled with a gas under pressure. In greater detail, the device comprises a cylinder which is adapted for connection at one end to a pressure vessel or the like filled with gas under pressure. A piston within the cylinder is movable longitudinally thereof and divides the interior of this cylinder into two separate chambers of which one chamber is in free, direct communication with the pressure vessel. Passage means, preferably within and extending through the piston, inter-connects the two chambers and suitable valve means, spring biased to a closed position, are associated with the passage means for controlling gas flow through the passage means between the chambers. Such valve means includes two separate check valves which are oppositely disposed and each opens in response to a predetermined excess pressure in a different one of the two chambers so that together they operate to limit the excess of gas pressure in either chamber over gas pressure in the other chamber.

Manually operable means is provided to move the piston within the cylinder to adjust the volume of the one chamber in communication with the pressure vessel and thereby to adjust gas pressure within the chamber. The last mentioned means preferably takes the form of a relatively coarse screw thread which inter-connects the cylinder with a tubular sleeve and a relatively fine screw thread which inter-connects the tubular sleeve with a rod connected to the piston. Thus by a given rotation of the sleeve relative to the cylinder the coarse thread means provides a relatively large movement of the piston longitudinally of and within the cylinder; while a fine adjustment of the piston position can be obtained by moving the piston rod with respect to the sleeve, using the fine adjusting thread for vernier adjustment. Means are also provided to place the two chambers in communication of each other to equalize pressure in the two chambers at both sides of the piston. This may take the form of means for moving one of the check valves to an open position or a separate equalizing valve may be provided which can be manually operated.

The construction and characteristics of the present invention will be more readily understood by the reference to the following description and to the annexed drawing, in which:

FIG. 1 is a schematic view showing the pressure controller connected to a pressure vessel in a closed system.

FIG. 2 is a longitudinal median section through one form of the invention.

FIG. 3 is an enlarged fragmentary section of one of the check valves shown in the embodiment of FIG. 2.

FIG. 4 is a fragmentary longitudinal section illustrating a variational means for manually opening a check valve in the embodiment of FIG. 2 to equalize pressure between the two chambers.

FIG. 5 is a longitudinal median section of another form of the invention.

FIG. 6 is an enlarged fragmentary section showing in greater detail the piston in FIG. 5.

FIG. 7 is a fragmentary section on line 7—7 of FIG. 5.

A typical example of a system providing a closed circuit filled with gas under pressure is illustrated schematically in FIG. 1. In this system, the pressure controller 10 is connected by conduit 11 with pressure vessel 12 which represents a typical volume filled with gas under pressure. The pressure vessel 12 in this case is illustrative of any piece of apparatus similarly filled with gas under pressure. In this case the system is illustrated as being adapted to the comparison of various pressure indicating devices, for example the dead weight tester 14 being used as a standard for a comparison of the readings of manometer 15 which is being calibrated.

Details of the pressure controller are shown in FIGS. 2 and 3. In these figures it will be seen that the pressure controller 10 comprises a cylinder 16 within which is piston 17 which divides the interior space of the cylinder into two chambers 18 and 19. The cylinder is provided with two end closures 21 and 22. End closure 21 is provided with a blind threaded bore 21a to receive a mounting screw and is provided with a second threaded bore 21b which extends through the end closure and receives conduit 11, thus connecting the cylinder at this end to the pressure vessel 12. Chamber 18 is in free and direct communication with the interior of vessel 12.

Piston 17 is movable longitudinally within cylinder 16 and is provided with sealing means in the form of a pair of opposed, inwardly directed sealing cups 23 which engage the interior surface of the cylinder bore to effect a pressure tight seal between the piston and the cylinder at all positions of the piston. Sealing grease may be applied and held between the two cups. Closure 22 at the other end of the cylinder is attached to the end of the cylinder in any suitable manner, as by screw threads, to effect a pressure tight closure of the end of the cylinder. Thus the two chambers 18 and 19 are isolated from each other and each is adapted to hold gas under pressure.

For purposes which will be explained more fully, the device is provided with passage means extending between chambers 18 and 19, such passage means preferably being located in piston 17 and including two separate passages for gas to flow through the piston between the two chambers. Each complete passage comprises several parts. Thus one passage includes angular passage 24 formed by two intersecting drilled bores and terminating at one end in the larger bore 25 which opens to one face of the piston. As shown in FIG. 2, the larger bore 25 is threaded to receive a hollow plug 26 of which the hollow center 27 also forms a part of the complete gas passage.

As shown particularly in FIG. 3 a check valve 28 is located at the base of plug 26 between the plug and the bottom of bore 25. A compression spring 29 biases the check valve towards a closed position in engagement with the end of plug 26. The check valve comprises a disc having a stem which enters the central bore 27 of plug 26 to guide the valve, the disc portion of the valve having an O-ring 30 on its underside to effect a gas tight seal with the end face of plug 26. Valve 28 opens when gas pressure in chamber 19 exceeds that in chamber 18 by more than the predetermined differential established by the strength of spring 29.

The second gas passage is formed from similar components which have been designated by the same reference numerals with the subscript $a$ attached. It will be noticed that the flange of plug 26a has one or more openings 32a which are provided to afford communication between passage 24 and chamber 18 and thus complete the gas passage between the two chambers 18 and 19. A similar opening 32 in the flange of plug 26 places fluid passage 24a in communication with chamber 19.

The two check valves 28 and 28a are oppositely disposed so that each one of the valves opens in response to an excess of pressure in one of the two chambers 18 and 19. Preferably, though not necessarily, each of the valves is set to open at substantially the same pressure differential, for example 25 p.s.i. This being the case, the pressure in one chamber 18 or 19 cannot exceed the pressure in the other chamber by more than the differential at which the check valves are designed to open. The purpose of this valve is to prevent the pressure differential becoming excessive, that is, exceeding any predetermined value of the pressure differential.

In order to vary the volume of chamber 18 which is in communication with pressure vessel 12, and to thereby adjust the pressure of the gas within chamber 18, means are provided for manually moving piston 17 axially of cylinder 16 to any selected position. The last mentioned means includes a tubular sleeve 34 concentric with cylinder 16. The sleeve is connected to the cylinder by a relatively coarse screw thread 35, the sleeve being internally threaded to engage external threads on piston closure 22. By virtue of this inter-connection between the sleeve and the cylinder, relative rotation of these two parts results in movement of the sleeve axially of the cylinder.

At the outer end of sleeve 34 is disc 36. Beyond disc 36 is thumb screw 37 which has an integral threaded stem 37a received in a threaded bore in disc 36. Since sleeve 34 need not be closed tightly, disc 36 may be replaced by a spider or the like. As may be seen in FIG. 2, the threads at 38 are relatively fine compared with the threads at 35, for reasons which will be further explained. As a consequence of this threaded inter-connection between thumb screw 37 and sleeve 35, rotational movement of the thumb screw relative to the sleeve causes movement of the thumb screw and stem axially of the sleeve and cylinder.

Attached to piston 17 is piston rod 40, the piston rod extending through and beyond both cylinder closure 22 and disc 36. Piston rod 40 is concentric with the cylinder. The piston rod is connected to the piston by means of a threaded connection 40a, the piston rod being screwed into the central bore 27 in plug 26. In order not to close the bore to the flow of gas therethrough, the end of the piston rod is provided with an internal passage 41 which communicates with both cylinder chamber 19 and the gas passage 27. Closure 22 is provided with suitable sealing means, such as O-rings 42 in order to effect a pressure tight seal with the piston rod as it slides through closure 22. On the end of piston rod 40 and adjoining the outer face of thumb screw 37 there is provided collar 44 connected to piston rod 40 by pin 45 or other suitable means. At the inner end of the stem of the thumb screw there is a spring washer 46 mounted on the piston rod and bearing against the inner end of the stem. Thus washer 46 and collar 44 engage opposite ends of thumb screw 37 and the attached stem and restrain the piston rod against relative axial motion with respect to the thumb screw and stem.

Having described the construction of one form of the invention, its operation will now be described briefly. Pressures on the two sides of piston 17 are equalized by turning collar 44 to rotate piston rod 40 in a direction to screw it into bore 27 and cause the rod to advance relative to valve 28. The end of the piston rod engages the stem of the check valve, lifts it off its seat, and opens passage 32a, 24, 25, 27, 41 to place chambers 18 and 19 in communication with each other to equalize pressures in the two chambers. With the check valve thus held open, the pressure within the closed system is now brought close to the desired value by any suitable means, not shown. Piston rod 40 is then rotated in the opposite direction, permitting check valve 25 to seat.

After this, the pressure within the closed circuit can be raised or lowered by reducing or increasing respectively the volume of chamber 18 as a consequence of movement of piston 17 within cylinder 16. Piston 17 is now moved in the proper direction to increase or decrease the volume of chamber 18 as may be required. From the position shown in FIG. 2, the piston 17 may be moved to the right to increase the volume of chamber 18 and effect a corresponding reduction of pressure in the closed circuit. Movement of the piston is first accomplished by rotating the sleeve 34 around the cylinder, the coarse threaded connection 35 effecting a relatively large axial movement of piston 17 for a given rotational movement of sleeve 34.

When it is desired to effect a finer adjustment of the position of piston 17, this is accomplished by turning thumb screw 37, causing the thumb screw and stem to turn in disc 36 and by virtue of the threaded connection therewith to move axially of cylinder 16. The piston rod does not rotate. Axial movement of the thumb screw and stem, produces a corresponding movement of the piston rod and the attached piston 17. The fine thread 38 effects a relatively smaller axial movement of piston 17 for a given angular movement of the piston rod with respect to cylinder 16. By a combination of the coarse and fine adjustments, piston 17 can be precisely positioned with the result that the volume and the consequent gas pressure in chamber 18 can be controlled within very narrow limits. One of the pair of members consisting of disc 36 and thumbscrew 37 may carry an index and the other scale divisions which indicate the amount of relative rotation of the members and function as a vernier scale to obtain fine adjustment of the piston position in terms of a fraction of a rotation of sleeve 34.

FIG. 4 illustrates a form of the invention which contains a modification of the means for opening check valve 26 to equalize pressure in the two chambers. This form of the invention the controller is constructed as previously described except that piston rod 50 is hollow and is fixedly connected at the inner end to the piston. The hollow piston rod contains an axially extending push rod 51 which is slidable within piston rod 50. The outer end of push rod 51 extends beyond collar 44 and is provided with button 52 on the end of the rod. A compression spring 54 underneath button 52 bears against the face of collar 44 and normally urges push rod 51 outwardly or toward the right in FIG. 4. In order to engage check valve 28 to open the valve, pressure is applied against button 52 to move push rod 51 to the left into contact with the stem of valve 52. Continued movement then lifts the valve off its seat and opens the valve to permit flow of gas through the passage, as previously described. This movement of push rod 51 is accomplished without rotational or longitudinal movement of piston rod 50 relative to the stem.

Since passage 41 cannot be located as conveniently within the piston rod, as in the form of the invention illustrated in FIG. 2, this passage is replaced by a slot 55 cut in the wall of the threaded bore in plug 26, the slot being long enough to extend below the end of piston rod 50 so that the end of the slot is open and exposed to receive gas passing check valve 26. Otherwise the operation of this form of the invention is the same as previously described.

Referring now to FIGS. 5 and 6, there is illustrated therein a further variational form of the present invention which comprises cylinder 56 within which is piston 57 that divides the cylinder interior into the two chambers 18 and 19 and is movable longitudinally of the cylinder as before. Cylinder 56 is closed at one end by plug 59 which is removably retained in the cylinder by split ring 60, a gas tight seal being attained by means of O-ring 61 mounted in the end plug. The end plug is also provided with port 59a to which conduit 11 is connected to place chamber 18 in communication with vessel 12.

The other end of the cylinder is closed by a similar plug 63 which is also removably retained within the cylinder by means of a split ring 60 and is provided with sealing means in the form of O-ring 61.

Piston 57 performs the same functions as previously described but has been differently designed.

Passage means extending through the piston between chambers 18 and 19 includes a pair of differential bores 64 extending through the piston and each containing one of a pair of oppositely disposed check valves 65 and 65a. See FIG. 6 for details. The stem of the valve 65 is surrounded by compression spring 66 which bears against a shoulder in the differential bore on the piston and at the other end against a collar 67 held on the valve stem by retaining ring 68. The head of the valve carries an O-ring 70 on its underside, the O-ring resting against one face of the piston in order to effect a fluid tight seal therewith. The stem of valve 65 is hollow at 69, opening to chamber 18 at the end of the valve stem remote from the head of the valve. This internal passage 69 includes a cross passage 69c extending transversely of the valve stem. When the valve is moved to the right from the closed position of FIG. 5 as a result of excessive gas pressure in chamber 18, the cross passage is exposed above the surface of the piston and communicates with cylinder chamber 19 to permit gas to flow from chamber 18 to chamber 19.

Valve 65a is similarly constructed, the second valve being designated by the same reference numerals with the subscript a added. However, it will be noted that the valve 65a is oppositely directed so that it opens in response to an excess of pressure in chamber 19 whereas valve 65 opens in response to an excess of gas pressure in chamber 18.

In the embodiment of the invention previously described, one of the check valves is a dual purpose valve and could be opened to effect a pressure equalization between chambers 18 and 19. For this purpose, the present form of the invention is provided with a separate passage 72 formed by a pair of intersecting bores drilled angularly with respect to each other. One end of passage 72 is in open communication with chamber 19 while the other end of passage 72 is closed by valve 75. Valve 75 has a head on the underside of which is located O-ring 76 which bears against the face of the piston to effect a gas tight seal at that point. The stem of the valve slides within a bore in the piston; and passage 72 intersects this bore receiving the valve stem. The stem of valve 75 may have one or more longitudinal grooves 75a which allow gas to pass freely out of passage 72 and around the valve stem into chamber 18, or in the reverse direction, when valve 75 is in the open position.

Manually operable means to move the valve 75 to an open position includes push rod 77 which is slidably mounted in and concentric with piston rod 80 which is fixedly connected at its inner end to piston 57, as by threads at 80a in FIG. 6.

As before, piston rod 80 provides manually operated means for moving the piston in order to vary the volume of chamber 18 includes a tubular sleeve 81 which is connected to cylinder 56 by means of a relatively coarse thread indicated at 82. The outer end of tubular sleeve 81 is closed by fixed disc 83 but the disc does not tightly close sleeve 81. Centrally of disc 83 is a threaded bore in which is mounted the stem 85 of thumbscrew 86. The stem 85 is connected to disc 83 by means of surrounding sleeve 85a fastened securely to the stem and connected to disc 83 by a relatively fine thread at 82 for the reasons given above. Sleeve 85a and stem 85 function as a unit.

Piston rod 80 which extends longitudinally of and is located coaxially within cylinder 56 and tubular sleeve 81, slides within bushing 88 mounted in end plug 63 of the cylinder. O-ring 87 provides a gas tight seal with the rod as it slides through plug 63 and the bushing. The piston rod also extends through and beyond the disc 83 in the end of sleeve 81 and into a bore within stem 85 where there is located nut 89 set on the end of the piston rod. Collar 90 is non-rotatably attached to the piston rod by set screw 91 and may be further secured against movement along the piston rod by a split retaining ring 92. The diameter of collar 90 is sufficiently large that it limits the outward travel of the piston rod with respect to disc 83 by engagement therewith. Nut 89 is tightened against the bottom of the bore in stem 85, bringing collar 90 into engagement with the end face of the stem. The stem is thus held between collar 90 and nut 89 on the piston rod causing the piston rod to be moved axially of the sleeve with the thumbscrew and its stem. The latter moves axially of the sleeve and cylinder as it is rotated because of the screw thread connection at 82.

Push rod 77 within the piston rod is normally biased to the outward or extended position shown in FIG 5 by means of compression spring 93 which is held between nut 89 and a second nut 94 threaded onto push rod 77. Nut 94 is held in place by lock nut 95. A push button 96 slides within a bore in thumbscrew 86 and bears against the outer end of nut 95. When pushed inwardly, toward the left in FIG. 5, pressure on the push button brings it into engagement with lock nut 95 and continued movement causes longitudinal movement of push rod 77 in a direction to open equalizing valve 75. Chambers 18 and 19 are now in free communication. When pressure on push button is released, spring 93 returns the push button and push rod to the position shown, closing valve 75 and isolating the chambers from each other. Leakage around the push rod is prevented by sealing means such as O-ring 97 carried by the piston rod.

In order to retain push button 96 in the bore within thumbscrew 86, and also to provide an optional means of locking the push button in the inner position holding valve 75 open, a pointed set screw 98 is located in the side of thumb screw 86. The point of the set screw rides in an L-shaped slot 99, shown in FIG. 7. The long leg of the slot permits axial movement of the push button. In addition, if the push button is rotated a short distance clockwise, viewed from the right hand end, when the button is pressed in, the point of set screw 98 is moved into the outer or transverse section of slot 99 and the balancing valve 75 may be held locked in the open position. The valve may then be released by rotating push button 96 in the opposite direction to bring the point of set screw 98 back into the longitudinally extending portion of the L-slot 99.

I claim:

1. A device for adjusting gas pressure within a closed pressure system, comprising in combination:
    a closed-ended cylinder adapted at one end for connection to said pressure system, both ends of the cylinder being sealed except for said connection at said one end;
    a piston longitudinally movable within the cylinder and dividing the interior of the cylinder into two separate chambers, one chamber being in communication with the pressure system;
a plurality of normally closed passages extending between the two chambers;
a pair of oppositely opening loaded check valves associated with and normally closing two of said passages and opening in opposite directions between the two chambers to automatically limit the excess of gas pressure in either chamber over gas pressure in the other chamber;
and manually operable means to move and positively set the piston within the cylinder in selected positions to adjust the volume of said one chamber and thereby to adjust gas pressure within said one chamber and the connected pressure system.

2. A device as in claim 1 which also comprises means manually operable to place the two chambers in open communication with each other to equalize gas pressures in both chambers at will.

3. A device as in claim 1, and including also manually operated means for controllably opening at least one of said plurality of normally closed passages to place the two chambers in open communication with each other to equalize gas pressures in both chambers at will.

4. A device as in claim 1 which also includes manually operated means to open one of said check valves to place the two chambers in open communication with each other to equalize gas pressures in both chambers at will.

5. A device as in claim 1 which also includes manually operated means for opening a third one of said normally closed passages to place the two chambers in open communication with each other to equalize gas pressures in both chambers at will.

6. A device for adjusting gas pressure within a closed pressure system, comprising in combination:
a closed ended cylinder adapted for connection at one end to the pressure system, both ends of the cylinder being sealed except for said connection at said one end;
a piston within and movable axially of the cylinder and dividing the interior of the cylinder into two separate chambers of which one is in communication with the pressure system;
a piston rod attached to the piston and sealingly extending through one closed end of the cylinder and screw threadedly connected to the cylinder to move it and the piston axially of the cylinder upon relative rotation of said connection;
a normally closed passage extending through the piston between the two chambers;
and manually operated means associated with the piston rod for opening said normally closed passage to place the two chambers in free inter-communication to equalize gas pressures in both chambers at will.

7. The device as defined in claim 6 including also an external sleeve surrounding and connected externally to the cylinder by means including a screw thread enabling the sleeve to be moved axially of the cylinder upon relative rotation; the piston rod being connected to the sleeve to move it and the piston axially with the sleeve.

8. A device for adjusting gas pressure within a closed pressure system, comprising in combination:
a closed ended cylinder adapted for connection at one end to the pressure system, both ends of the cylinder being sealed except for said connection at said one end;
a piston within and movable axially of the cylinder and dividing the interior of the cylinder into two separate chambers of which one is in communication with the pressure system;
a piston rod attached to the piston and sealingly extending through one closed end of the cylinder and screw threadedly connected to the cylinder to move it and the piston axially of the cylinder upon relative rotation of said connection;
a plurality of normally closed passages extending through the piston between the two chambers;
two oppositely opening loaded check valves associated with and normally closing two of said passages and opening in opposite directions between the two chambers to automatically limit the excess of gas pressure in either chamber over gas pressure in the other chamber;
and manually operated means associated with the piston rod and operating to open one of said normally closed passages for placing the two chambers in free communication with each other to equalize gas pressures in both chambers at will.

9. A device for adjusting gas pressure within a closed pressure system, comprising in combination:
a closed ended cylinder adapted for connection at one end to the pressure system, both ends of the cylinder being sealed except for said connection at said one end;
a piston within and movable axially of the cylinder and dividing the interior of the cylinder into two separate chambers of which one is in communication with the pressure system;
an external sleeve surrounding and connected externally to the cylinder by means including a relatively coarse screw thread enabling the sleeve to be moved axially of the cylinder upon relative rotation;
a piston rod attached to the piston and sealingly extending through one closed end of the cylinder, the piston rod being connected to the sleeve by means including a relatively fine screw thread enabling the rod to be moved axially of the sleeve upon relative rotation of said connection,
a normally closed passage extending through the piston between the two chambers;
and manually operated means associated with the piston rod for opening said normally closed passage to place the two chambers in free inter-communication to equalize gas pressure in both chambers at will.

10. A device for adjusting gas pressure within a closed pressure system, comprising in combination
a closed ended cylinder adapted for connection at one end to the pressure system, both ends of the cylinder being sealed except for said connection at said one end;
a piston within and movable axially of the cylinder and dividing the interior of the cylinder into two separate chambers of which one is in communication with the pressure system;
an external sleeve surrounding and connected externally to the cylinder by means including a relatively coarse screw thread enabling the sleeve to be moved axially of the cylinder upon relative rotation;
a piston rod attached to the piston and sealingly extending through one closed end of the cylinder, the piston rod being connected to the sleeve by means including a relatively fine screw thread enabling the rod to be moved axially of the sleeve upon relative rotation of said connection;
a plurality of normally closed passages extending through the piston between the two chambers;
two oppositely opening loaded check valves associated with and normally closing two of said passages and opening in opposite directions between the two chambers to automatically limit the excess of gas pressure in either chamber over gas pressure in the other chamber;
and manually operated means associated with the piston rod and operating to open one of said normally closed passages for placing the two chambers in free communication with each other to equalize gas pressures in both chambers at will.

11. A device as in claim 10 in which the last mentioned means includes a rod slidable axially of the piston rod to open one of the normally closed passages through the piston.

12. A device as in claim 10 in which the last mentioned means includes a third passage through the piston between the chambers and valve means controlling flow therethrough, said valve being biased to a closed position, and a rod slidable axially of the piston rod to move said last mentioned valve means to an open position.

13. A device as in claim 10 in which the piston rod is movable axially of and relative to the piston to engage and open one of the check valves to equalize gas pressures in both chambers.

References Cited in the file of this patent

UNITED STATES PATENTS 2,538,897    Butler et al. _____ Jan. 23, 1951

FOREIGN PATENTS 286,725    Switzerland _____ Mar. 2, 1955